2 Sheets--Sheet 1.
A. M. BLANCHARD.
Improvement in Milk Coolers.
No. 125,531. Patented April 9, 1872.
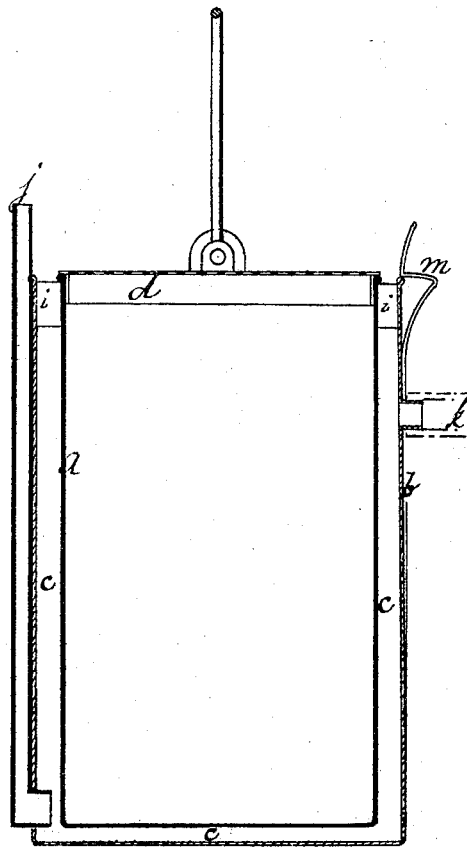
FIG. I
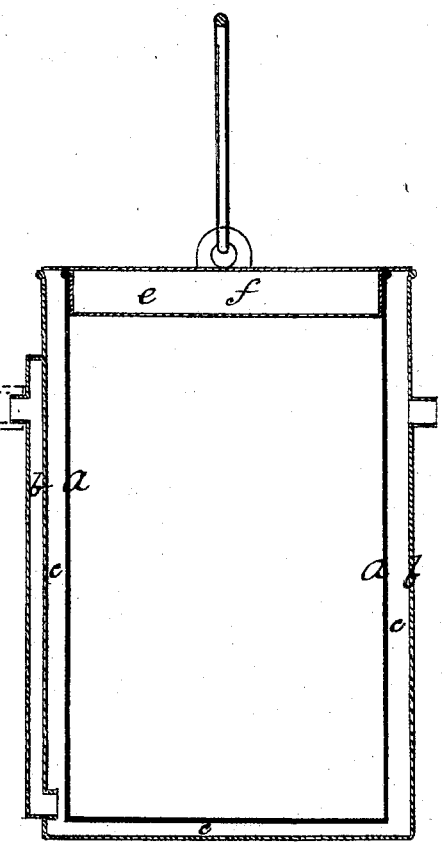
FIG. II
WITNESSES:
Geo. N. Norvard.
Geo. E. Brown.
INVENTOR:
A. M. Blanchard 2 Sheets--Sheet 2.
A. M. BLANCHARD.
Improvement in Milk Coolers.
No. 125,531. Patented April 9, 1872.
Fig. III.
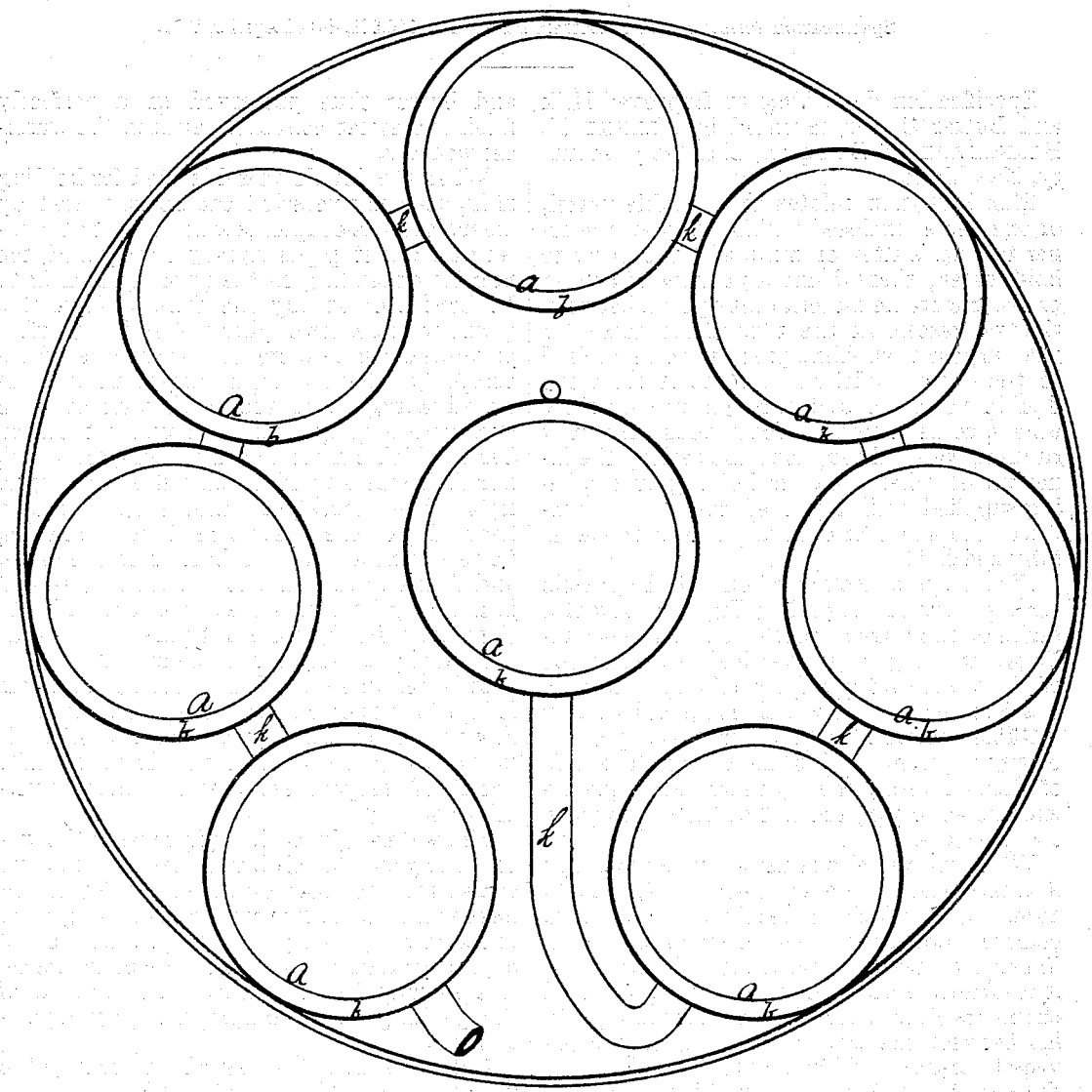
WITNESSES:
Geo. N. Howard
Geo. E. Brown
INVENTOR:
A M Blanchard 125,531

UNITED STATES PATENT OFFICE.

ALBERT M. BLANCHARD, OF ELLINGTON, NEW YORK.

IMPROVEMENT IN MILK-COOLERS.

Specification forming part of Letters Patent No. 125,531, dated April 9, 1872.

Specification describing an Improved Milk and Butter Cooler, invented by ALBERT M. BLANCHARD, of Ellington, Chautauqua county, New York.

This invention relates to a double vessel, or one vessel inclosed within another, the inner to hold butter or milk, and the outer to hold water; there being a packing of rubber or other suitable material interposed between the two vessels at the tops of the same, for the purpose of enabling pressure to be applied to the water sufficient to force it from one double vessel to and through one or more others, so as to form a continuous current of running water throughout the series; the inner vessel, when used for holding butter, being supplied with a packed cover having inclosed chambers for dead air, all as hereinafter fully specified.

Figure 1 is a section of one of the vessels arranged for holding milk; Fig. 3, a view of a series of the vessels connected by hose-couplings; and Fig. 2 is a vertical section of one of the vessels arranged for holding butter.

$a$ $b$ is the double vessel, composed of any suitable material, of any desired shape, and of any required dimensions, the relative sizes of the two vessels being, according to preference, so as to vary the size of the water-space $c$ at pleasure.

When the vessel $a$ is used for holding milk it is furnished with a screen-cover, $d$, so as to admit light, which is necessary in order to color the cream, and yet to exclude insects. When the vessel $a$ is used for holding butter it is furnished with a cover, $e$, having inclosed chambers $f$ for dead air, and having a packing between the cover and vessel, making the vessel air-tight. When butter is placed in the vessel $a$, with a quantity of ice, with such a cover and packing, and when the vessel $a$ is placed inside the vessel $b$, with a water-tight packing, $i$, between the two vessels $a$ $b$, so as to prevent evaporation from the latter; and when cold water is introduced through the pipe $j$ into the vessel $b$, the cold produced inside the vessel $a$ can be maintained by means of the chambered cover and the surrounding water for almost any length of time, and butter thus preserved in a perfectly fresh and sweet condition, even in the warmest weather.

When the double vessel is used for holding milk, as many vessels $b$ can be connected by means of hose-couplings $k$ attached to the inlet and outlet pipes as may be required, the number depending on the quantity of milk to be kept cool at any one time. When this quantity increases or diminishes the number of vessels can be increased or diminished accordingly, wherein this arrangement presents an advantage over the large vats or pans commonly employed for cooling milk, the number of which cannot be conveniently changed, nor their size altered to suit the quantity of milk. The current of water enters under a head at $j$ of the first vessel $b$ of the series, flows downward to the bottom of the same, and then flows upward to the outlet-pipe, and is discharged through the hose-coupling $k$ into the next vessel $b$, wherein it pursues a similar course, and so on through the series.

It is well understood that the action of air is injurious to cream, and that deep and narrow vessels are consequently best to set milk in. Causing the water to flow in the manner described keeps these deep and narrow vessels cool.

The water-tight packing $i$ prevents the water in any one vessel, $b$, from overflowing, and causes it all to pass under pressure into the next vessel, so that any practicable degree of pressure can be employed to produce as fast or as slow a current of water through the series as may be expedient. The function of the packing $i$ is, therefore, a highly important one.

In hot weather it is desirable to change the water with great rapidity in order to keep it constantly cool. By my arrangement the whole quantity in any vessel can be changed once every minute.

The hose-couplings enable the vessels $b$ to be disposed in a circle or any shape required for close packing.

Springs $m$ are attached to the side of the vessel $b$, and, when the vessel $a$ is forced down far enough to seal the space $c$ by means of the packing $i$, the springs $m$ slip over the inner vessel and hold it. On pulling back the springs the vessel $a$ is raised somewhat by the action of the water surrounding it, the specific gravity of which is greater than that of milk. This rising of the vessel $a$ facilitates its removal after skimming.

I claim as my invention—

1. The double vessel $a\ b$, having the packing $i$ and inlet and outlet pipes, as and for the purpose specified.

2. The combination of the vessels $a\ b$ and springs $m$, as set forth.

A. M. BLANCHARD.

Witnesses:
GEO. E. BROWN,
GEO. H. HOWARD.